(No Model.)
G. W. WASHBURN.
METHOD OF AND MACHINE FOR CLEANING AND DELINTING COTTON SEED.
No. 535,428. Patented Mar. 12, 1895.
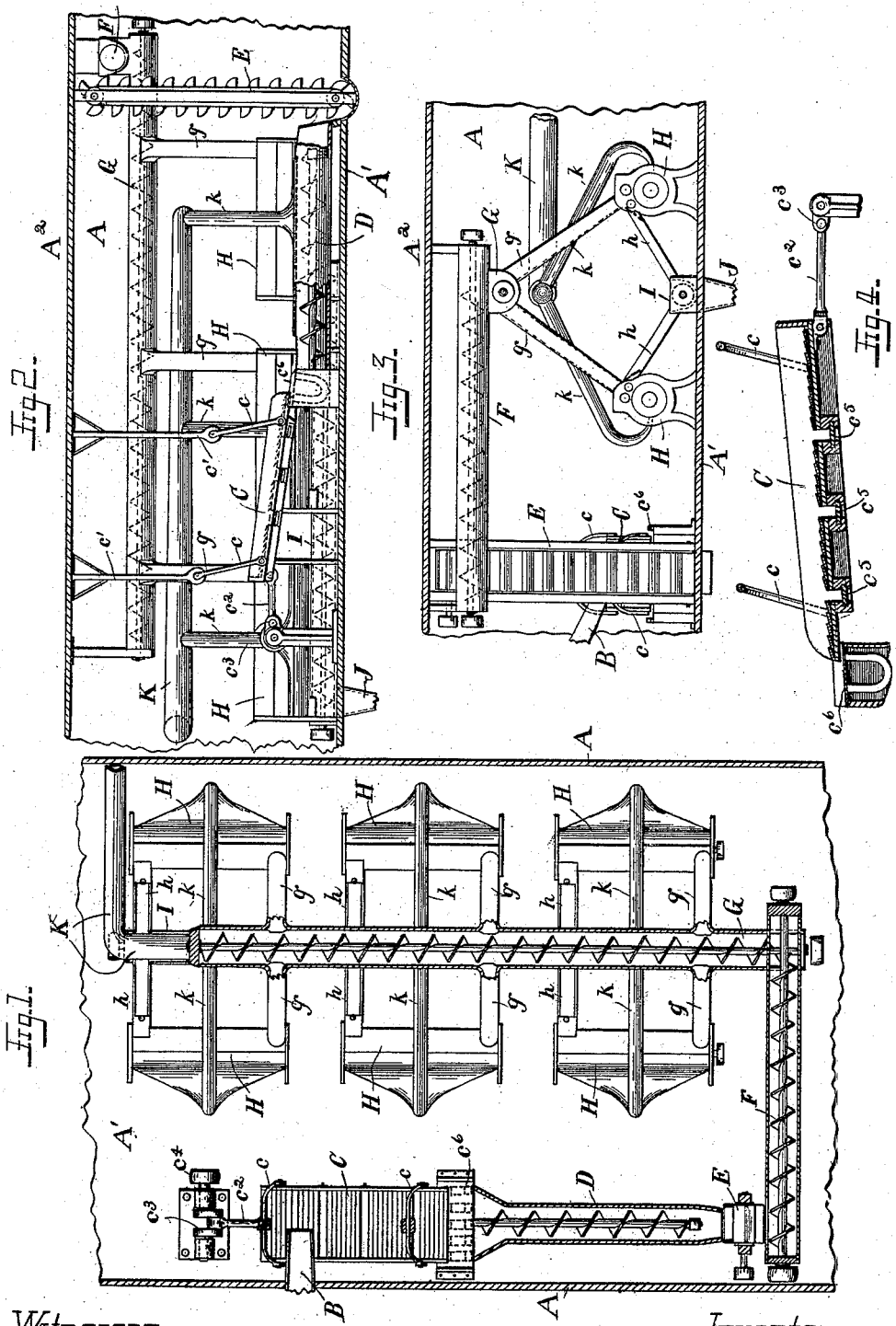
Witnesses
Ralph C. Enyart
Emma Lyford
Inventor
George W. Washburn
By Geo. J. Murray Atty

UNITED STATES PATENT OFFICE.

GEORGE W. WASHBURN, OF MEMPHIS, TENNESSEE, ASSIGNOR TO THE NATIONAL COTTON SEED OIL AND HULLER COMPANY, OF SAME PLACE.

METHOD OF AND MACHINE FOR CLEANING AND DELINTING COTTON-SEED.

SPECIFICATION forming part of Letters Patent No. 535,428, dated March 12, 1895.

Application filed May 24, 1893. Serial No. 475,340. (No model.)

*To all whom it may concern:*

Be it known that I, GEORGE W. WASHBURN, a citizen of the United States, and a resident of Memphis, in the county of Shelby and State of Tennessee, have invented certain new and useful Improvements in Methods of and Machines for Cleaning and Delinting Cotton-Seed, of which the following is a specification.

My invention relates to a method of and machine for cleaning and delinting cotton seed and collecting the lint. Its object is to obviate the necessity of handling the seed after it has undergone the rough delinting process in the customary gins used for the purpose in cotton seed oil mills, and to thoroughly delint the seed, collect the lint and deliver the delinted seed to the hullers.

It is well known that it is easier to hull and separate the hulls from the meats of the delinted seed than it is from the seeds covered with the short lint as they leave the gins, and it is also well known that the undelinted seeds absorb a considerable amount of oil and the hulls are not so well adapted for feeding stock as are the delinted hulls. In the processes now in common use for treating cotton seed for the manufacture of cotton seed oil, the process, as carried on, is practically continuous from the time the seed is passed to the rough cleaner until it is hulled and the meat separated from the hulls and passed to the crushing rolls. In this process as used, the undelinted seed passes directly from the gins to the hullers; but when it was found desirable to delint the seed, it was collected from the gins, fed in the ordinary way to separate delinters, which required considerable labor and constant attention to feed the seed to the delinter through the customary hoppers. It was also found that the seed when leaving the gins was not in condition to be fed to an abrading delinting cylinder, as there were no means known of freeing the seed from hard foreign substances that might get into it, which substances would injure or destroy the delinting cylinder.

The means by which I accomplish the objects aimed at, consists in interposing between the gins and hullers, mechanism to free the seeds from all impurities, automatically feed the seeds, when so freed, to the delinters, automatically deliver the seeds from the delinters to the hullers and collect the lint from the delinters and convey it to the lint room.

The accompanying drawings represent the mechanism for accomplishing this result, arranged in what I term the delinting room, of which—

Figure 1 is a horizontal section taken through the upper portion of the room, and through the spiral conveyer in the upper part of the room, and the spiral conveyer leading from the cleaner. The delinters, which may be of any approved construction, are shown in plan view. Fig. 2 is a vertical section through the room, showing the mechanism in elevation. Fig. 3 is a vertical section taken at right angles to the view shown in Fig. 2. Fig. 4 is an enlarged sectional view of the shaker or cleaner.

Referring to the parts, which are indicated by similar reference letters in the different views, A represents the side walls, A' the floor and $A^2$ the ceiling of the room.

B is the end of the discharge spout leading from the gins in the adjoining room and discharging on to the shaker or cleaner C in the delinting room. The shaker consists of an inclined trough, hung upon yokes $c$, which yokes are hung in bearings $c'$ secured to the ceiling, or other permanent part of the building. At the rear end it has journaled to it a pitman $c^2$, which is journaled to the crank shaft $c^3$, the shaft being fitted with a pulley $c^4$ to receive a belt which imparts a rapid shaking motion to the trough. The bottom of the trough is fitted with transverse slats, lapped one over the other, so as to form transverse troughs, which arrest and turn the seed while passing through it. The trough is also, as clearly seen in Fig. 4, provided with three pockets $c^5$, each pocket being closed by a sliding plate at the bottom. The object of these troughs is to collect any heavy substances that may be fed from the gins on the trough, and detain them to be removed by pulling out the bottom of the pockets, or by hand if desired. The constant shaking of the trough will cause the heavier portions to drop to the pocket, while the lighter portions pass over to this discharge end. Pebbles, and small, smooth, hard substances will be collected in the troughs, but nails, wire and other metallic substances are liable to be retained by the lint upon the seeds and carried along with them and discharged over the lower inclined end of the trough. These metallic substances, if allowed to pass to the delinters, which have abrading emery cylinders to strip the seeds clean of lint, would greatly injure or ruin the abrading cylinder. I have provided means to forcibly separate the iron from the lint bearing seed before it reaches the delinters. By forcibly, I mean a positive separation of the iron from the lint bearing seed by means of magnetic attraction, in contradistinction to such separation as may be caused by the action of gravity. This separation I accomplish by placing below the discharge end of the shaker, a number of horseshoe magnets, inclosed in a suitable box and having a soft iron plate $c^6$ secured over their opposite poles. The seed must pass over these magnets and any nails, wire, or other metallic substances carried along with the seed, will be attracted and held upon the inclined plate, and can be readily removed by the attendant.

The seed discharged over the magnetic plate $c^6$ drops into the spiral conveyer D, which is arranged near the floor of the building and is carried and discharged into the bucket elevator E. The elevator E carries up and delivers the seed into the receiving end of the spiral conveyer F, running transversely across the room. From this conveyer it is delivered into another spiral conveyer G, which is arranged longitudinally of the room and parallel with the delinters H, which are arranged preferably in pairs, as shown in Fig. 1. From the conveyer G the seed is delivered to the head or receiving ends of the delinters H, through inclined delivery chutes $g$. The seeds, in passing from the head to the tail of the machines, are delinted and passed from the delinters through discharge spouts $h$, which deliver the delinted seed into the spiral conveyer I, from which they are carried and delivered through the spout J, which leads to the hullers in the room beneath the delinting room.

The lint is drawn up from the machines through spouts $k$, which connect with the pipe K, which pipe is carried through the wall of the delinting room and into the lint room. The pipe K is exhausted by a fan, (not shown,) arranged in the lint room, and the lint thrown against a condenser in the usual manner. The end of the pipe K in the delinting room is closed and the draft is drawn through the delinters, which are open underneath for the purpose of admitting air.

The particular form of shaker and delinter herein shown, is not claimed, as other devices for similar purposes may be substituted.

It is obvious that the relative position of the parts may be changed, and other features added without departing from the spirit and scope of my invention.

What I claim as new, and desire to secure by Letters Patent, is—

1. The described method of cleaning and delinting cotton seed which consists, first, in shaking the seed to take out and separate the hard, smooth substances; second, forcibly removing such metallic substances as adhere to the lint; third, delinting the cotton seed; fourth, separating the detached lint from the seed.

2. The combination of the vibrating cleaner provided with pockets to receive the heavy substances separated from the seed by the vibratory action of the cleaner, a series of magnets at the discharge end of the cleaner to attract and separate metallic substances from the seed, an elevator to convey the cleaned seed to the overhead conveyer, the delinters arranged underneath said conveyer, the overhead conveyer having discharge spouts connecting it with each delinter, a common air exhaust trunk for all the delinters, separate spouts connecting the several delinters with the said exhaust trunk, the common seed conveyer for all the delinters and discharge spouts connecting each delinter with the common seed conveyer; whereby the seed is automatically cleaned, delinted and the seed separated from the lint, and the lint and seed conveyed from the delinters separately from each other, substantially as shown and described.

GEORGE W. WASHBURN.

Witnesses:
F. P. POSTON,
JNO. J. MURPHY.